(12) United States Patent
Morral et al.

(10) Patent No.: US 10,195,837 B2
(45) Date of Patent: Feb. 5, 2019

(54) PRODUCTION OF JOINTS

(71) Applicant: Zephyros, Inc., Romeo, MI (US)

(72) Inventors: Xabier Morral, Barcelona (ES);
Michael Czaplicki, Rochester Hills, MI (US); Ira Miller, Niederhaslach (FR)

(73) Assignee: Zephyros, Inc., Romeo, MI (US)

( * ) Notice: Subject to any disclaimer, the term of this patent is extended or adjusted under 35 U.S.C. 154(b) by 674 days.

(21) Appl. No.: 14/372,604

(22) PCT Filed: Feb. 4, 2013

(86) PCT No.: PCT/IB2013/000135
§ 371 (c)(1),
(2) Date: Jul. 16, 2014

(87) PCT Pub. No.: WO2013/114195
PCT Pub. Date: Aug. 8, 2013

(65) Prior Publication Data
US 2015/0013902 A1    Jan. 15, 2015

(30) Foreign Application Priority Data

Feb. 3, 2012   (GB) .................................. 1201943.6

(51) Int. Cl.
*B21D 39/02* (2006.01)
*B32B 37/30* (2006.01)
*F16B 11/00* (2006.01)
*B60J 5/04* (2006.01)

(52) U.S. Cl.
CPC ............. *B32B 37/30* (2013.01); *B60J 5/0469* (2013.01); *F16B 11/006* (2013.01); *B21D 39/028* (2013.01); *B32B 2307/51* (2013.01)

(58) Field of Classification Search
CPC ........................................................ B32B 37/30
See application file for complete search history.

(56) References Cited

U.S. PATENT DOCUMENTS

| | | |
|---|---|---|
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |

(Continued)

FOREIGN PATENT DOCUMENTS

| | | |
|---|---|---|
| EP | 1041130 | 10/2000 |
| EP | 1331080 A3 | 10/2004 |

(Continued)

OTHER PUBLICATIONS

Machine translation of JP 63-297175 A, Ishizaki, date unknown.*

(Continued)

*Primary Examiner* — Jeffry H Aftergut
*Assistant Examiner* — Jaeyun Lee
(74) *Attorney, Agent, or Firm* — The Dobrusin Law Firm, PC

(57) ABSTRACT

Surfaces 1, 2 are bonded together by a heat activated adhesive 3 that is applied to a surface 2 to cover an area greater than the area that is to form the bond, the two surfaces 1, 2 are brought together and the adhesive 3 activated so that it creates the bond and also covers the exposed edges of the surfaces to provide an aesthetically pleasing and coatable corrosion and rust protective layer.

20 Claims, 3 Drawing Sheets

(56) References Cited

U.S. PATENT DOCUMENTS

| | | | |
|---|---|---|---|
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 4,719,689 A | 1/1988 | Yamamoto et al. | |
| 5,248,559 A * | 9/1993 | Okui | C08G 59/226 428/414 |
| 5,275,853 A | 1/1994 | Silvis et al. | |
| 5,464,924 A | 11/1995 | Silvis et al. | |
| 5,783,298 A * | 7/1998 | Herring, Jr. | B21D 39/021 137/268 |
| 5,962,093 A | 10/1999 | White et al. | |
| 6,000,118 A | 12/1999 | Biernat | |
| 2003/0067187 A1 | 4/2003 | Curtiss | |
| 2003/0116282 A1 | 6/2003 | Hutter | |
| 2004/0046423 A1* | 3/2004 | Wieber | B62D 27/026 296/203.03 |
| 2004/0204551 A1 | 10/2004 | Czaplicki et al. | |
| 2008/0060757 A1* | 3/2008 | Hable | C09J 5/08 156/325 |
| 2008/0188609 A1* | 8/2008 | Agarwal | C08L 51/04 524/504 |

FOREIGN PATENT DOCUMENTS

| | | | | |
|---|---|---|---|---|
| EP | 2231348 B1 | | 5/2011 | |
| GB | 2455292 A | | 6/2009 | |
| JP | 60-029479 | | 2/1985 | |
| JP | 63-202680 | | 8/1988 | |
| JP | 63297175 A | * | 12/1988 | |
| JP | S63297175 A | | 12/1988 | |
| JP | 03258611 A | * | 11/1991 | |
| JP | 2007185690 A | * | 7/2007 | ............ B21D 19/08 |
| WO | 97/01052 | | 1/1997 | |
| WO | 03/022953 A1 | | 3/2003 | |
| WO | WO 2009071269 A1 | * | 6/2009 | ........... B21D 39/021 |

OTHER PUBLICATIONS

Machine translation of JP2007-185690A, date unknown.*
Machine translated document JP 03258611 A (Year: 1991).*
EP Office Action dated Sep. 12, 2014, Application No. 13715737.6.
GB Search Report dated Jun. 6, 2012, Application No. GB1201943.6.
International Search Report and Written Opinion dated Jul. 12, 2013, Application No. PCT/IB2013/000135.
International Preliminary Report on Patentability dated Aug. 14, 2014, Application No. PCT/IB2013/000135.
International Preliminary Report on Patentability dated Jun. 17, 2010; Application No. PCT/EP2008/010214.
PCT Search Report and Written Opinion dated May 26, 2009 (Application No. PCT/EP2008/010214).
Chinese Office Action dated Dec. 12, 2011; Application No. 200880125203.6.
Japanese Office Action dated May 29 2013; Application No. 2010-536367.
Corresponding International Publication No. WO2009/071269A1, published on Jun. 11, 2009, including the International Search Report.
European Office Action dated Mar. 8, 2016; Application No. 13715737.6.
Mexican Office Action dated Apr. 10, 2017, Application No. MX/a/2014/008812.

* cited by examiner

PRODUCTION OF JOINTS

The present invention relates to improvements in or relating to the production of joints. In particular the invention relates to an improved method for the production of joints in automobile manufacture and in one embodiment in the joining together of automobile panels by the production of a hem flange. The invention is further concerned with improving the appearance of the joints and also improving the corrosion and rust prevention at the location of the joints so formed.

In the manufacture of many articles including transportation vehicles such as automobiles including cars, trucks, busses, caravans and the like, aircraft and railroad vehicles it is necessary to seal joints between two surfaces lying adjacent to one another often to seal surfaces in generally parallel planes, for example surfaces (such as panels) that are butted together or overlap one another. U.S. Pat. No. 4,719,689 illustrates such a technique. The invention is applicable to such sealing and is particularly useful in the formation of a hem flange, such as may be found on a vehicle body. The invention also relates to a method of sealing a joint between two adjacent surfaces such as two substantially parallel surfaces.

A hem flange between two panels is formed by turning an extended edge portion of one panel back over an edge portion of a second panel and sealing the edge of the second panel within the cavity formed by the extended edge portion of the first panel. Hem flanges can be found in various locations in vehicle bodies where two panels are joined together, for example on doors, boot lids and bonnets. A vehicle door, for example, may be formed from an inner panel and an outer panel joined together along their outer edges by a hem flange which is formed by turning the extended edge portion of the outer panel back over the edge portion of the inner panel to form an overlap joint, and crimping the edges together. A seal is then needed between the edge of the outer panel and the adjacent surface of the inner panel, to keep moisture out of the space between the panels and prevent corrosion. Traditionally two or three different materials have been used to provide the join, an adhesive, a paintable covering layer and perhaps a protective layer such as wax to avoid corrosion and rusting. This invention allows the joint to be produced employing fewer materials.

If a vehicle component such as a door is damaged, it can sometimes be repaired by replacing only the outer panel but, if that is done, it is clearly desirable (from the point of view of the vehicle owner) that the repaired door should match the original as closely as possible not only in quality but also in appearance. In practice, one of the most difficult parts of the repair job is to seal the hem flange effectively and in such a way that it closely resembles the seal on the original door, which would generally have been formed by an automated process.

The formation of a hem flange is described in PCT publication WO 97/01052 and in JP 63-202680 and sealing materials useful for the formation of a hem flange seal are described in WO 03/022953.

In these techniques the joint between the two metal pieces is formed by first forming a U or C shaped cup at the end of one of the metal pieces, inserting the edge of the second metal piece into the U or C shaped cup and providing a sealant material within the remaining space of the U or C shaped cup which bonds the two metal pieces together. The sealant material is typically a pumpable material and may be heat activatable so that its adhesive properties are developed at temperatures employed during vehicle manufacture such as, for example, paint bake ovens or anti-corrosion (e-coat) bake ovens employed in automobile manufacture. The sealant materials that are used are often foamable. In many operations it is necessary to provide a desired surface finish and weatherproofing over the joint. For example in many instances such as a vehicle hem flange the joint must have a good aesthetic appearance, and it must be damp and moisture resistant so that it does not become a site for rust or other forms of corrosion. It is therefore common practice to provide a finishing material such as a PVC layer and/or a paintable wax over the sealant and any exposed edges of the metal panels to provide protection and the desired surface finish.

PCT publication WO 03/022953 describes the production of a hem flange which can serve to reduce and/or eliminate the step of pre-crimping the selected panels during the manufacturing process. The method comprises providing a structural member having two substrates forming a space to be joined; placing a structural material within the space. The material comprising, in parts by weight, less than about twenty percent (<20%) ethylene copolymer, less than about forty percent (<40%) epoxy, less than about thirty percent (<30%) epoxy-based resin, less than about two percent (<2%) blowing agent and from about one percent (1%) to about five percent (5%) curing agent, (and optionally includes any of the following components; less than about two percent (<2%) curing agent accelerator, from about twenty-five percent (25%) to fifty-five percent (55%) filler, and less than about one percent (>1%) of colouring agent. The structural material is placed in proximity of the space to be joined, the structural material is then exposed to heat or other energy source causing the structural material to flow, fill, and cure in the defined area or space to be joined thereby providing post-cure structural integrity and rigidity to the selected area or space of the vehicle which may be a land, marine, or aerospace vehicle.

However the use of this method requires a finishing material in order to avoid corrosion and enable painting particularly at edges of the panels that remain exposed after sealing. Furthermore, the production of joints in this manner is time consuming and also can result in joints of variable quality having irregularities and unsightly sections.

European Patent Publication 2231348 provides an alternative to this technique in which the bond is formed employing a single heat activated foamable material to effect the bond. The material is used in an amount such that when it expands it flows as a viscous material outwardly from the channel to provide a protective layer over the panel edges at the ends of the U or C channel. This further overcomes the difficulties associated with the use of a pumpable adhesive which has a low viscosity and can be squeezed out from the channel or washed out during the coating and washing techniques employed with the metal assemblies during automobile assembly such as anticorrosion coating sometimes known as e-coat.

The techniques of European Patent Publication 2231348 when used in the sealing of automobile hem flanges involve the provision of the heat activated foamable adhesive on both sides of the first panel in the area of the panel that is inserted in the C or U shaped channel formed in the end of the second panel. The material is then activated by heat so that it foams and fills the spaces within the U or C shaped cavity and exudes out of the cavity to cover the ends of the cavity and provide a corrosion resistant and rust proof layer.

The technique of EP 2231348 suffers from the disadvantages that the heat activated foamable material must have an expansion ratio sufficient to both fill the cavity and flow out of the cavity to provide a corrosion resistant and rust proof layer over the exposed ends of the panel. This high degree of expansion can result in the presence of undesirable voids in the foamed adhesive leading to weaknesses in the bond.

Additionally the voids in the adhesive that provides the protective layer are unsightly and also provide an irregular surface unsuitable for painting or other forms of coating.

The present invention addresses these issues.

The present invention therefore provides a method for joining two surfaces wherein a heat activatable and expandable sealant material is adheringly provided to a first surface wherein the expandable sealant material is applied in a manner that extends beyond the area where the bond between a second surface and the first surface is to be formed and the first surface with the adhesive thereon is located adjacent to the second surface and once assembled the heat activatable material is activated to bond the surfaces together and provide a protective layer outside the region of the bond.

Although the heat activatable and expandable sealant may be applied to just one of the surfaces to be joined, it may be applied to either surface, alternatively it may be applied to both surfaces. The protective layer should, at least, cover the exposed edges of the elements (such as metal panels) which provide the surfaces to be bonded together.

The heat activatable material is preferably applied to the surface or surfaces by extrusion and the heat extrusion process is preferably a robotic process in which a pre-determined amount of the sealant material is provided at a pre-determined temperature. We have found that this method enables a rapid formation of a joint in a single operation and can avoid the need for pre-gelling the material. It can also avoid the need to provide an additional surface finish and the need for wax protection. The pre-application of the material also enables a better control of the sealant that is employed resulting in a more uniform joint of improved appearance. The material may be applied to the first surface at one location and the part carrying the material may be transported to another location for joining to the second surface. Although not preferred, other deposition methods may be used to provide the activatable and expandable material. We have found that the use of the techniques of the present invention reduces the problems of inconsistent foaming associated with the prior art methods such as those described in WO 03/022953 and provides an improved surface finish compared to the Techniques of European Publication 2231348.

The material that is applied to the first surface according to the present invention may be any suitable material that develops adhesive properties at the activation temperature and can be expanded at the desired higher temperature. It can be chosen according to the nature of the materials to be joined and the type of joint required. In particular it is a material that can be extruded on to the first surface so that it adheres thereto but is not expanded by the conditions employed in the extrusion. Furthermore it is preferred that the material is not tacky to the touch at ambient temperatures so that it and/or components carrying the material can be transported and handled without picking up dirt or dust or sticking to the hands of the operator. The material should however soften and flow at its activation temperature so that it can flow and expand to bond the two metal surfaces together and cover the exposed edges of the elements. When used for making a hem flange the material should flow and expand to fill the C or U shape.

The amount of material employed can be carefully controlled by employing a robotic applicator such as those described in European Patent Application Publication 1331080 A1. In the production of hem flange, it is preferred that the amount of the sealant material is such that upon expansion the sealant will fill the C or U shaped cup so that no space remains within the cup in which dirt or moisture can accumulate thereby providing a site for the formation of corrosion. The fact that the activatable material extends beyond the area that the seal is to be made enables the material to cover the border of the joint to enhance rust prevention with a relatively low degree of expansion. This in turn allows a lower expansion ratio to be employed which provides a surface with reduced voids providing a skin with a more pleasing surface and more receptive to paint and/or other coating materials. It also allows the heat activatable and expandable material to serve the dual function of an adhesive and a sealant, in certain instances also providing a paintable protective outer layer.

The invention is also useful for bonding together of substrates in an overlapping relationship. For example, it can be used for the welding of two flat panels where the adhesive extends to at least one side beyond the overlapping area with previous bonding with glue in which the adhesive is located totally within the area of overlap, the adhesive can be washed away during coating operations and also does not provide a sufficient area for painting and it has been necessary to apply a further layer such as a PVC strip.

The extent that the adhesive extends beyond the area where the joint is to be performed depends upon the nature of the material and the thickness of the elements to be joined. However, it is preferred that the adhesive extends up to about 10 mm beyond the area where the joint is to be performed.

The activatable material employed in the present invention typically includes a polymeric admixture, an impact modifier and one or more of a combination of a blowing agent, a curing agent and a filler. The activatable material preferably includes at least three of the following:

(a) about 2 to about 80 percent by weight epoxy resin;
(b) about 2 to about 70 percent by weight polymer (e.g., epoxy)/elastomer adduct;
(c) one or more additional polymers, which typically include a one or more ethylene polymers or copolymers;
(d) about 2 to about 70 percent by weight impact modifier;
(e) up to about 5 parts by weight of a blowing agent;
(f) up to about 7 parts by weight of a curing agent; and
(g) a filler.

In a preferred aspect of the invention, the impact modifier includes one or more core/shell polymers, although these are not necessarily required.

The present invention may be applied to providing joints in various articles of manufacture. Examples of such articles of manufacture include, without limitation, household or industrial appliances, furniture, storage containers, buildings, structures or the like. In preferred embodiments, the activatable material is used to join metal components particularly portions of an automotive vehicle such as body or frame members of the automotive vehicle. In a preferred embodiment of the invention the material employed will expand (e.g., foam) to a volume no greater than 100% of its volume in the unexpanded state preferably from 50 to 100% of its unexpanded state. In a preferred embodiment where the invention is used in automobile manufacture, it is preferred that the material expand at the temperatures experienced in the paint bake or e-coat anticorrosion ovens.

Typically 120° C. to 260° C., more preferably 140° C. to 260° C., more preferably 160° C. to 240° C. In a further preferment the material will cross link when it expands to provide a firm bond between the first and second surfaces and a strong protective layer over the exposed edges of the components.

Percentages herein refer to weight percent, unless otherwise indicated.

Epoxy Resin

Epoxy resin is used herein to mean any of the conventional dimeric, oligomeric or polymeric epoxy materials containing at least one epoxy functional group. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the activatable material includes up to about 80% or more of an epoxy resin. More preferably, the expandable material includes between about 2% and 70% by weight epoxy resin and still more preferably between about 4% and 30% by weight epoxy resin. That weight percentages may be lower or higher when other ingredients such as the adduct, filler, alternative polymers, combinations thereof or the like are used in greater or lesser weight percentages.

The epoxy may be aliphatic, cycloaliphatic, aromatic or the like. The epoxy may be supplied as a solid (e.g., as pellets, chunks, pieces or the like) or a liquid (e.g., an epoxy resin). As used herein, unless otherwise stated, a resin is a solid resin if it is solid at a temperature of 23° C. and is a liquid resin if it a liquid at 23° C. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the activatable material to increase the adhesion, flow properties or both of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Moreover, various mixtures of several different epoxy resins may be employed as well. Examples of suitable epoxy resins are sold under the tradename DER® (e.g., DER 331, DER 661, DER 662), commercially available from the Dow Chemical Company, Midland, Mich.

Adduct

While it is contemplated that various polymer/elastomer adducts may be employed according to the present invention, one preferred adduct is an epoxy/elastomer adduct. In a highly preferred embodiment, an elastomer-containing adduct is employed in the activatable material of the present invention in a relatively high concentration. The epoxy/elastomer hybrid or adduct may be included in an amount of up to about 80% by weight of the adhesive material. More preferably, the elastomer-containing adduct is approximately at least 5%, more typically at least 7% and even more typically at least 10% by weight of the activatable material can be up to 60% or more, but more preferably is about 10% to 30% by weight of the activatable material. Of course, the elastomer-containing adduct may be a combination of two or more particular adducts and the adducts may be solid adducts or liquid adducts at a temperature of 23° C. or may also be combinations thereof. In one preferred embodiment, the adduct is composed of substantially entirely (i.e., at least 70%, 80%, 90% or more) of one or more adducts that are solid at a temperature of 23° C.

The adduct itself generally includes about 1:5 to 5:1 parts of epoxy or other polymer to elastomer, and more preferably about 1:3 to 3:1 parts of epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of preferred epoxy/elastomer adducts are sold under the tradename ARALDITE DY 965 CH commercially available from Huntsman and HYPDX RK 8-4 commercially available from CVC Chemical. Examples of additional or alternative epoxy/elastomer or other adducts suitable for use in the present invention are disclosed in United States Patent Publication 2004/0204551, which is incorporated herein by reference for all purposes.

The elastomer-containing adduct, when added to the activatable material, preferably is added to modify structural properties of the activatable material such as strength, toughness, stiffness, flexural modulus, or the like. Additionally, the elastomer-containing adduct may be selected to render the activatable material more compatible with coatings such as water-borne paint or primer system or other conventional coatings.

Polymer or Copolymer

The activatable material will typically include one or more additional polymers or copolymers, which can include a variety of different polymers, such as thermoplastics, elastomers, plastomers combinations thereof or the like. For example, and without limitation, polymers that might be appropriately incorporated into the polymeric admixture include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprises a small portion or a more substantial portion of the expandable material (e.g., up to 85% by weight or greater). Preferably, the one or more additional polymers comprises about 0.1% to about 50%, more preferably about 1% to about 20% and even more preferably about 2% to about 10% by weight of the activatable material.

In certain embodiments, it is preferred to include one or more thermoplastic polyethers and/or thermoplastic epoxy resins in the activatable material. When included, the one or more thermoplastic polyethers preferably comprise between about 1% and about 90% by weight of the activatable material, more preferably between about 3% and about 60% by weight of the activatable material and even more preferably between about 4% and about 25% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093, which are incorporated herein by reference for all purposes. Advantageously, the thermoplastic polyethers can provide the activatable material with various desirable characteristics such as desirable physical and chemical properties for a wide variety of applications as is further described herein.

Although not required, it is preferable for the polymeric admixture to include one or more ethylene polymers or copolymers such as ethylene acrylates, ethylene acetates or the like. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Impact Modifier

Generally, it is preferable for the activatable to include at least one impact modifier. As used herein, like with any other ingredients of the present invention, the term "impact modifier" can include one impact modifier or plural impact modifiers. Various impact modifiers may be employed in the practice of the present invention and often include one or more elastomers. It is generally preferable for the impact modifier to be at least 4%, more typically at least 7%, even more typically at least 10% by weight of the activatable material and also preferable for the impact modifier to be less than 90%, more typically less than 40% an even more typically less than 30% by weight of the activatable material, although higher or lower amounts may be used in particular embodiments.

In one embodiment of the present invention, the impact modifier includes at least one shell/core impact modifier and preferably the impact modifier includes a substantial portion of core/shell impact modifier. In one preferred embodiment, the impact modifier is compromised of at least 60%, more typically at least 80% and even more typically at least 97% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell impact modifiers are formed by emulsion polymerization. It is also preferred for the impact modifier to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto core made from polymers of soft or elastomeric containing compounds such as butadiene or ethyl acrylate. U.S. Pat. No. 3,985,703, which is herein incorporated by reference, describes useful core-shell polymers, the cores of which are made from butyl acrylate but can be based on ethyl isobutyl, 2-ethylhexyl or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful impact modifiers include, but are not limited to those sold under the tradename, PARALOID, commercially available from Rohm & Haas Co. One particularly preferred grade of PARALOID impact modifier is polymethyl methacrylate shell and MBS core modifier sold under the designation EXL-2691A.

Blowing Agent

One or more blowing agents may be added to the activatable material for producing inert gasses that form, as desired, an open and/or closed cellular structure within the activatable material. In this manner, it may be possible to lower the density of articles fabricated from the material. In addition, the material expansion can help to improve sealing capability, acoustic damping or both.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4$_i$-oxy-bis-(benzenesulphonylhydrazide), trihydrazinotriazine and N,N$_i$-dimethyl-N,N$_i$-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages.

Preferably, however, the material, the blowing agent or both of the present invention are thermally activated. Alternatively, other agents may be employed for realizing activation by other means, such as moisture, radiation, or otherwise.

Curing Agent

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0.001% by weight to about 7% by weight.

Preferably, the curing agents assist the activatable material in curing by crosslinking of the polymers, epoxy resins or both. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

Filler

The activatable material may also include one or more fillers, including but not limited to particulated materials (e.g., powder), beads, microspheres, or the like. Preferably the filler includes a relatively low-density material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 10% or less to 90% or greater by weight of the activatable material, but more typical from about 30 to 55% by weight of the activatable material. According to some embodiments, the activatable material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

It is contemplated that most nearly any additional chemicals, materials or otherwise may be added to the activatable material assuming they are suitable for the activatable material and suitable for a chosen application of the activatable material.

One preferred polymeric additive is an oxide such as polyethylene oxide, which acts as a relatively high molecular weight coagulant that can assist in trapping gas and reducing sag. Such a coagulant will typically have a molecular weight of at least about 800,000, more typically at least about 2,000,000 and still more typically at least about 4,000,000 (e.g., about 5,000,000). One example of such an additive is sold under the tradename POLYOX WSR and is commercially available from Dow Chemical Company.

Other additives, agents or performance modifiers may also be included in the activatable material as desired, including but not limited to a UV resistant agent, a flame retardant, an impact modifier, a heat stabilizer, a colorant, a processing aid, a lubricant, a reinforcement (e.g., chopped or continuous glass, ceramic, aramid, or carbon fiber, particulates or the like).

When determining appropriate components for the activatable material, it may be important to form the material such that it will only activate (e.g., flow, foam or otherwise change states) at appropriate times or temperatures. For instance, in some applications, it is undesirable for the material to be reactive at room temperature or otherwise at the ambient temperature in a production environment. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

Formation and Application of the Activatable Material

Formation of the activatable material can be accomplished according to a variety of new or known techniques. Preferably, the activatable material is formed as a material of substantially homogeneous composition. However, it is contemplated that various combining techniques may be used to increase or decrease the concentration of certain components in certain locations of the activatable material.

According to one embodiment, the activatable material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the activatable material may be formed by heating one or more of the components that is generally easier to soften or liquidize such as the polymer based materials to induce those components into a mixable state. Thereafter, the remaining components may then be intermixed with the softened components.

Depending upon the components used, it may be important to assure that the temperature of the components remains below certain activation temperatures that might cause the activatable material to activate (e.g., form gasses, flow, cure or otherwise activate) or both. Notably, when the activatable material contains a blowing agent, it is typically desirable to maintain the temperature of the activatable material below a temperature that will activate the blowing agent during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to applying heat, pressure or both to materials.

After formation of the activatable material, the material is applied to the surface or surfaces of one or more of the components that are to be bonded together over an area greater than the area required for the bonding of the two components and under conditions that it adheres to the surface or surfaces. Subsequently the material is activated to foam or bubble to a low degree, for example, to cause an expansion of from 25 to 100% preferably from 50 to 100% of the unexpanded state. Such foaming or bubbling assists the activatable material in wetting the surface or surfaces of the components and forming an intimate bond between the surfaces as well as covering any exposed edges of the components. Formation of the intimate bond will typically but not necessarily occur upon curing of the activatable material.

The present invention is illustrated but in no way limited by reference to the accompanying drawings in which FIG. 1 shows a prior art with seal employing an adhesive and the wax.

FIG. 4b is an expanded version of a section of FIG. 4a;

FIG. 5b is an expanded version of a section of FIG. 5a;

Figure 1:
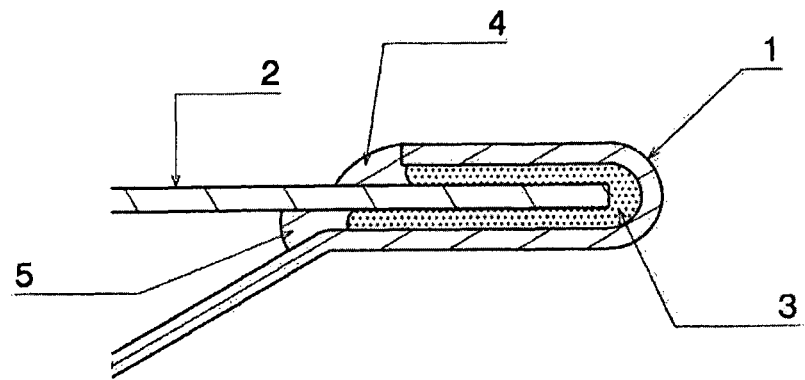
FIG. 1 shows a hem flange sealing between a first panel (1) whose end is bent to form a "U" shape into which the end of a second panel (2) extends where it is held by the foamed adhesive (3) which extends within the "U" shape. The joint is provided with a protective PVC layer (4) and a wax layer (5) in order to provide corrosion protection and a coatable surface.
Figure 2:
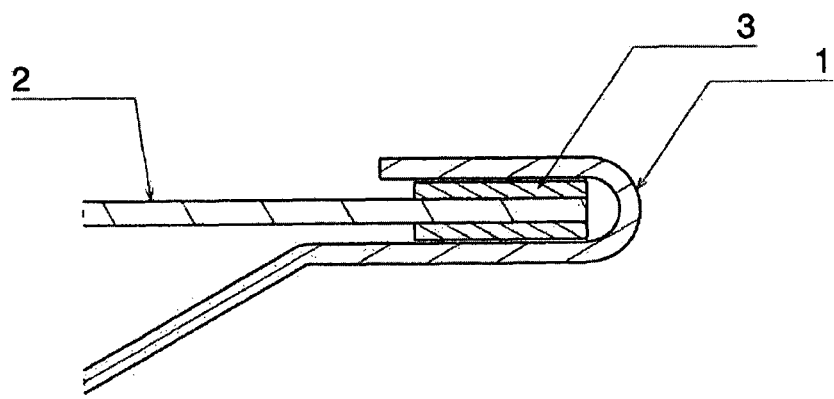
FIG. 2 shows a hem flange following EP 2231348 prior to cure of the adhesive.
Figure 3:
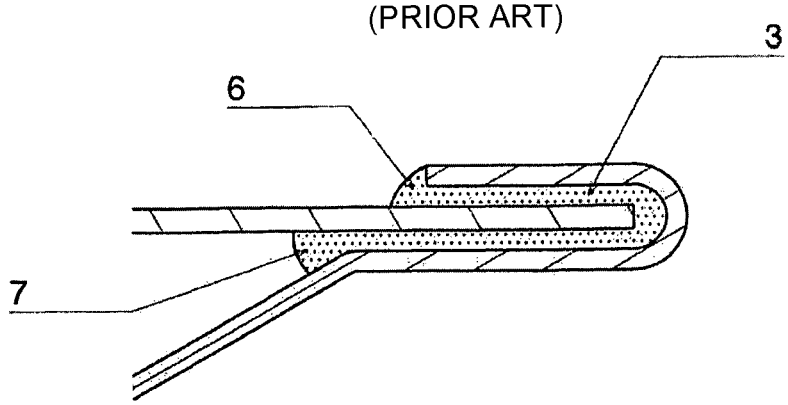
FIG. 3 shows a hem flange following EP 2231348 after expansion of the adhesive.
Figure 4A:
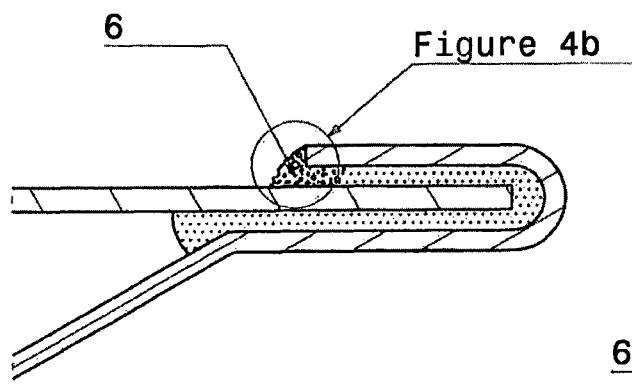
FIG. 4a shows a hem flange following EP 2231348 showing the unattractive surface unsuitable for coating.
Figure 4B:
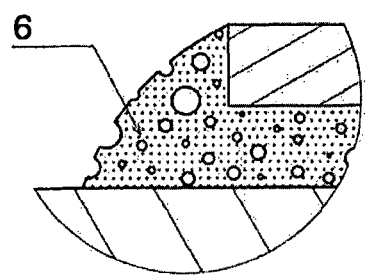

FIG. 2 shows a similar hem flange in which the adhesive (3) is provided in unfoamed state on the surface of panel (2) and FIG. 3 shows how the adhesive may be foamed to secure the two panels together and exude out of the "U" shape to form the protective regions (6) and (7). FIGS. 4a and 4b show how with the system of FIGS. 2 and 3 the high expansion ratio of the adhesive provides an irregular foam which is unsightly and difficult to coat and also results in a foam the extent of which is difficult to control.

Figure 5A:
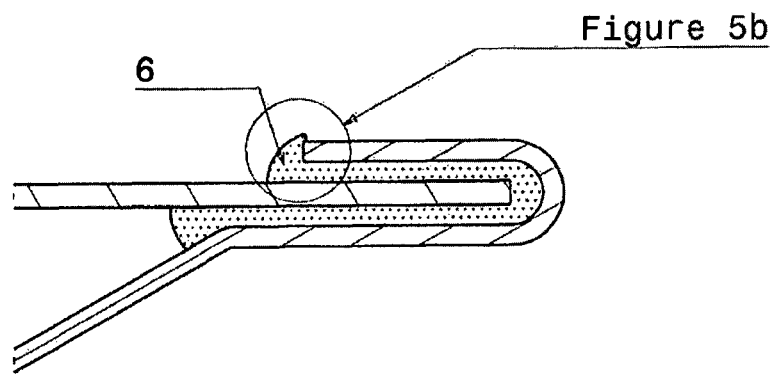
FIG. 5a shows a hem flange following EP 2231348 showing how the foam can extend beyond the desired location.
Figure 5B:
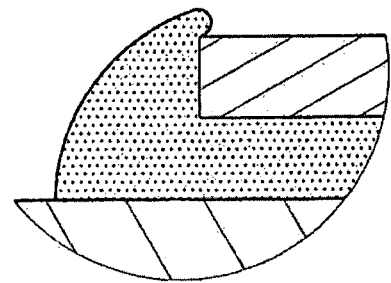

FIG. 5a shows how the large expansion ratio required for the techniques of EP 2231348 can result in the foam extending further than required as shown in more detail in FIG. 5b. The foam is not only unsightly but can be knocked and damaged and/or removed.

Figure 6:
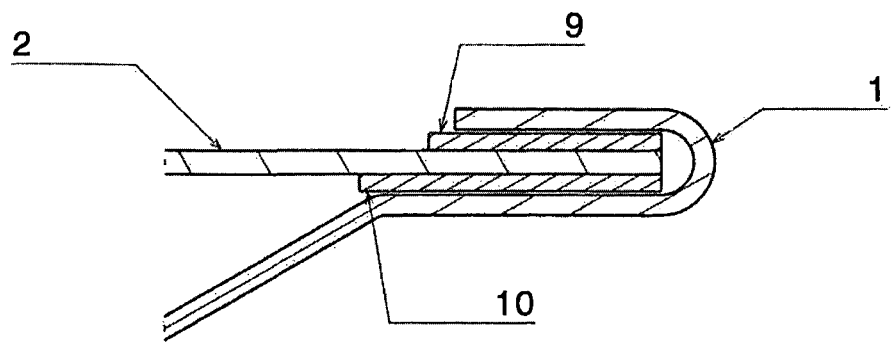
FIG. 6 shows a hem flange according to the present invention.

FIG. 6 shows a system according to the present invention for forming a hem flange in which the adhesive (8) is in an unfoamed state and protrudes beyond the area of overlap at (9) and (10) ready for activation to form the bond.

Figure 7A:
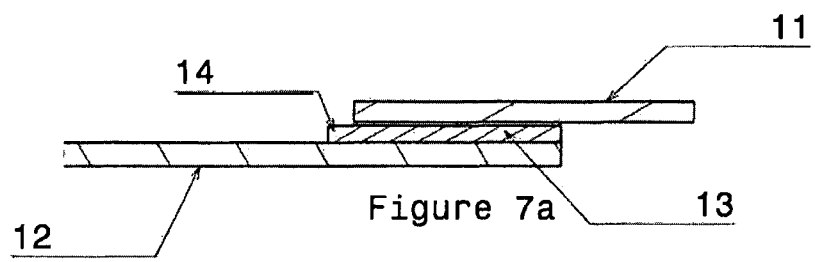
FIG. 7a shows a flat assembly according to the present invention with the adhesive on one panel.
Figure 7B:
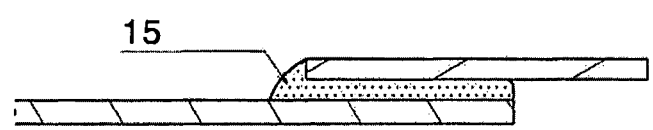
FIG. 7b shows the flat assembly of FIG. 7a with the adhesive on one panel the adhesive being in an expanded state.

FIG. 7a shows how the invention may be used to bond together two overlapping flat panels (11) and (12) with the adhesive (13) extending at one end (14) beyond the area of overlap. FIG. 7b shows how the adhesive may be foamed to bond the panels together and provide the protective coatable strip (15).

Figure 8A:
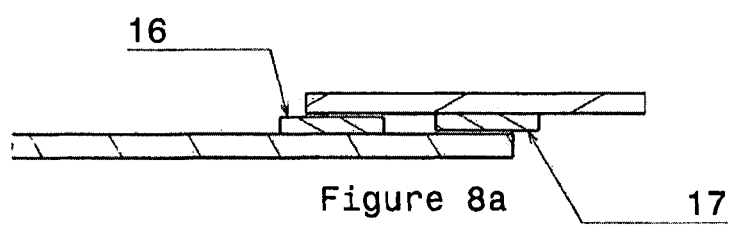
FIG. 8a shows the flat assembly according to the present invention with the adhesive on both panels.
Figure 8B:
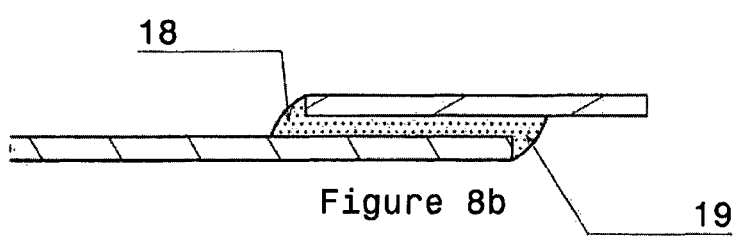
FIG. 8b shows the flat assembly of FIG. 8a with the adhesive on both panels in an expanded state.

FIG. 8a shows how two pieces of the adhesive (16) and (17) may be used according to the invention to extend beyond both ends of the overlapping area and which may be foamed as shown in FIG. 8b to bond the panels together and provide the protective layers (18) and (19).

The invention claimed is:

1. A method for joining two panels comprising:
adhering a heat activatable and expandable sealant material in a plurality of locations to a first panel, a second panel, or both, wherein the expandable sealant material in each of the plurality of locations is applied via an extrusion process and is located at least partially within, and also extending beyond, an area where the bond between the second panel and the first panel is to be formed, and the first panel is located adjacent to the second panel;
assembling the first panel and second panel to form a joint; and
activating the expandable sealant to bond the panels together and provide a protective layer outside the region of the bond that covers one or more exposed edges of the first panel, the second panel, or both,
wherein the method is free of an additional surface finish or wax protection applied during activation of the expandable sealant, after activation of the expandable sealant, or both.

2. The method of claim 1, wherein the expandable sealant is applied to one of the panels to be joined.

3. The method of claim 1, wherein the expandable sealant is applied to both panels to be joined.

4. The method of claim 1, wherein the expandable sealant is dry to the touch.

5. The method of claim 1, wherein after activation, the expandable sealant provides a coatable surface.

6. The method of claim 1, wherein the joint is a hem flange.

7. The method of claim 1, wherein the first and second panels are parallel panels and the expandable sealant extends beyond one side of an overlapping area.

8. The method of claim 1, wherein the panels are parallel panels and the expandable sealant extends beyond both sides of an overlapping area.

9. The method of claim 1, wherein upon activation the expandable sealant expands by from 25% to 100% of an original unexpanded volume.

10. The method of claim 1, wherein the expandable sealant material extends beyond an area where the joint is formed by up to 10 mm.

11. The method of claim 1, wherein the expandable sealant includes a polymeric admixture, an impact modifier and one or more of a blowing agent, a curing agent and a filler.

12. The method of claim 1, wherein the expandable sealant includes at least three of the following:
  a) 2 to 80 percent by weight epoxy resin;
  b) 2 to 70 percent by weight polymer (e.g. epoxy)/elastomer adduct;
  c) one or more additional polymers, which typically include one or more ethylene polymers or copolymers;
  d) 2 to 70 percent by weight impact modifier;
  e) up to 5 parts by weight of a blowing agent;
  f) up to 7 parts by weight of a curing agent; and
  g) a filler.

13. The method of claim 1, wherein the expandable sealant expands at a temperature within the range 120° C. to 260° C.

14. A method for joining two panels comprising:
adhering a heat activatable and expandable sealant material in a plurality of locations to a first panel, a second panel, or both, wherein the expandable sealant material in each of the plurality of locations is applied via an extrusion process and is located at least partially within, and also extending beyond, and area where the bond between the second panel and the first panel is to be formed, and the first panel is located adjacent to the second panel;
assembling the first panel and second panel to form a joint; and
activating the expandable sealant to bond the panels together and provide a protective layer outside the region of the bond that covers one or more exposed edges of the first panel, the second panel, or both,
wherein the method is free of an additional surface finish or wax protection applied during activation of the expandable sealant, after activation of the expandable sealant, or both; and
wherein the expandable sealant comprises at least four of the following:
  a) 2 to 80 percent by weight epoxy resin;
  b) 2 to 70 percent by weight polymer (e.g. epoxy)/elastomer adduct;
  c) one or more additional polymers, which typically include one or more ethylene polymers or copolymers;
  d) 2 to 70 percent by weight impact modifier;
  e) up to 5 parts by weight of a blowing agent;
  f) up to 7 parts by weight of a curing agent; and
  g) a filler.

15. The method of claim 14, wherein the expandable sealant is applied to one of the panels to be joined.

16. The method of claim 14, wherein the expandable sealant is applied to both panels to be joined.

17. The method of claim 14, wherein the expandable sealant is dry to the touch.

18. The method of claim 14, wherein after activation, the expandable sealant provides a coatable surface.

19. The method of claim 14, wherein the joint is a hem flange.

20. The method of claim 14, wherein the expandable sealant material extends beyond an area where the joint is formed by up to 10 mm.

\* \* \* \* \*